Patented Apr. 17, 1945

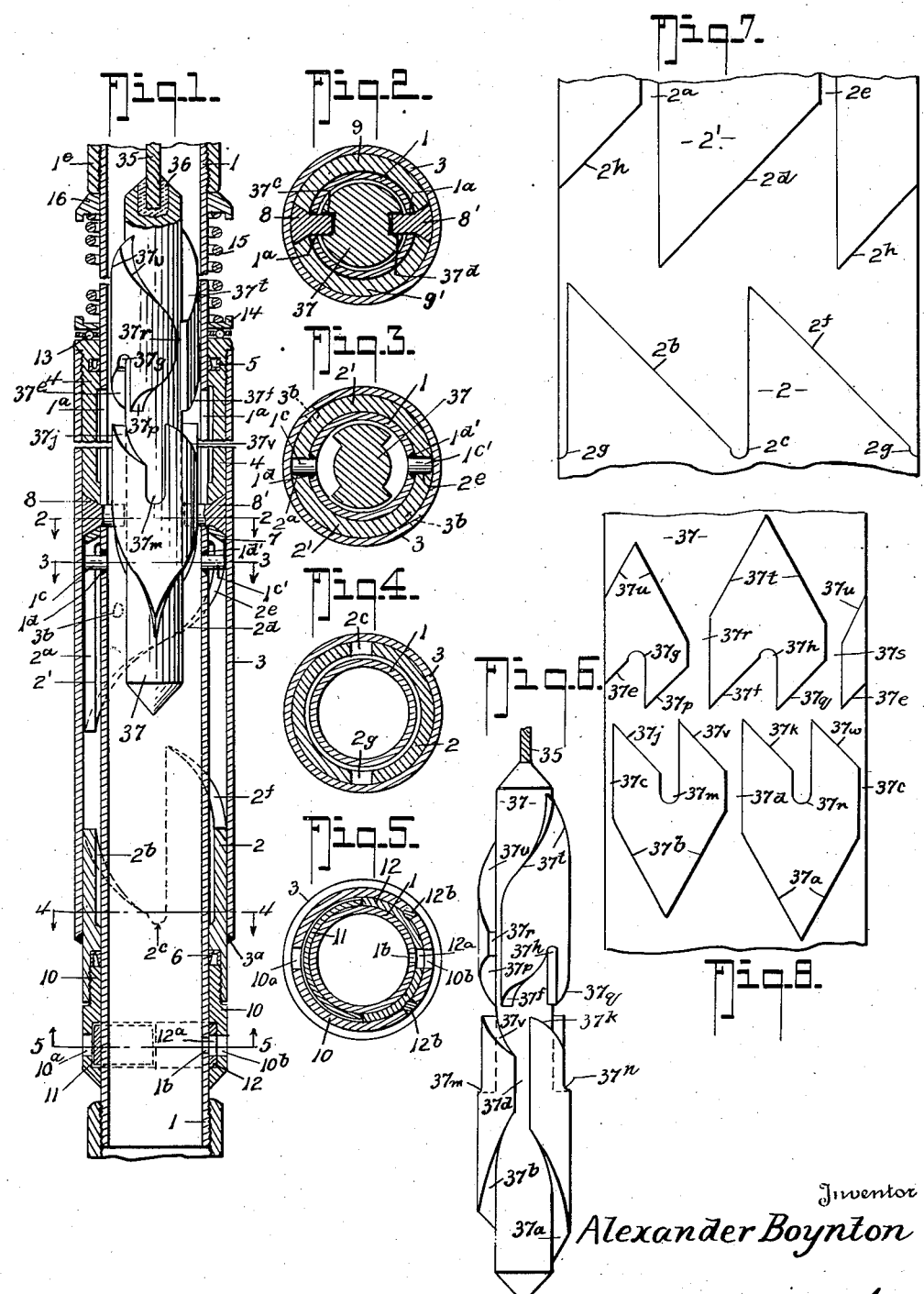

2,373,648

UNITED STATES PATENT OFFICE 2,373,648

REMOTELY CONTROLLED FLOW VALVE OPERATING TOOL

Alexander Boynton, San Antonio, Tex.; Sida S. Martin executrix of said Alexander Boynton, deceased Original application December 6, 1941, Serial No. 421,936. Divided and this application May 21, 1943, Serial No. 487,941

6 Claims. (Cl. 81—3)

My invention has for its object to provide a tool for use in operating remotely controlled flow valves for wells, such valves, for instances, as are disclosed in my application filed December 6, 1941, Ser. No. 421,936; of which application the present one is a division.

In the drawing:

Fig. 1 is a longitudinal section through the preferred embodiment of my invention, the operating tool being shown in elevation within the device.

Fig. 2 is a cross section on the line 2—2 of Fig. 1.
Fig. 3 is a cross section on the line 3—3 of Fig. 1.
Fig. 4 is a cross section on the line 4—4 of Fig. 1.
Fig. 5 is a cross section on the line 5—5 of Fig. 1.
Fig. 6 is an elevation of the tool turned 90 degrees from the position in which it is shown in Fig. 1.

Fig. 7 is a diagram of the slots, pockets, and helically inclined cam surfaces of the actuator sleeve.

Fig. 8 is a diagram of the slots, pockets, and helically inclined cam surfaces of the operating tool.

Similar characters of reference are employed to designate similar parts throughout the several views of the drawing.

In Fig. 1, the nipple 1, having the longitudinal slots 1a and the lateral inlet port 1b is adapted to be connected into the eduction tubing of a well. The actuator sleeve 2, in two opposed portions 2 and 2', the latter portion being in two parts as appears in Fig. 7, is secured within the shell 3 by the circular weld 3a and by the spot welds 3b, Figs. 1 and 3. Manifestly the actuator sleeve and the shell 3 are in effect only one part but for manufacturing convenience only are shown to be unitized by welding. Likewise the locking sleeve 4 and the valve housing sleeve 10 are in effect parts of the actuator shown separate for manufacturing and assembling convenience only.

The guide pin 1c is secured in the nipple 1 by the weld 1d, and the guide pin 1c' is secured in the opposite side of that nipple by the weld 1d'. The ring 7 is engaged upon the upper end of the sleeve upper portion 2', and supports the actuator pins 8' and 8'' upon which pins the locking sleeve 4 impinges by force of its threaded engagement within the shell 3. The semi-circular actuator pin spacers 9 and 9', Fig. 2, are likewise impinged between the sleeve 4 and the ring 7.

The actuator sleeve portions 2 and 2' and the locking sleeve 4, all secured upon the shell 3, are slidable over the nipple 1. The guide pins 1c and 1c' are slidable in the slots 2a and 2e of the actuator sleeve upper portion 2', Figs. 1, 3, and 7. The actuator pins 8 and 8' are slidable in the slots 1a of the nipple 1.

The coiled spring 15, engaged under the cap ring 16 supported by the coupling 1e, urges the washer 14 to engage the thrust bearing 13 upon the sleeve 4. The U cups or other form of packing 5 and 6, which are received within annular recesses of the sleeves 4 and 2, respectively, are slidable closely over the nipple 1 to prevent leakage into this nipple.

The valve housing sleeve 10, having the lateral openings 10a and 10b, is also slidable over the nipple 1 and is secured to the lower portion 2 of the actuator sleeve. This sleeve 10 has an internal annular recess within which the semicircular sleeve valve 11 and its similarly formed spacer 12, having the transverse opening 12a, are received. The sleeve valve 11 is free within said recess and the spacer 12 is secured therein by the welds 12b, see Fig. 5.

The lower portion 2 of the actuator sleeve has the pin pockets 2c and 2g and the lower helically inclined cam surfaces 2b and 2f (see Fig. 7). The upper portion 2' of the actuator sleeve has slots 2a and 2e and the upper helically inclined cam surfaces 2d and 2h, as also appears in Fig. 7. The upper inclined cam surface 2d is centrally above the pin pocket 2c; the upper inclined cam surface 2h is centrally above the pin pocket 2g; the lower inclined cam surface 2b is directly under the slot 2a; and the lower inclined cam surface 2f is directly under the slot 2e. This opposed relation between the inclined cam surfaces and the slots and pockets, coacting with the guide pins 1c and 1c', provides the valve position changing means, as will be explained further when the operation is discussed.

When the slot 2a contains the guide pin 1c and the slot 2e contains the guide pin 1c', the sleeve valve 11 is open and positioned opposite the opening 10a of the valve housing sleeve 10, while the lateral openings 10b, the transverse opening 12a, and the lateral inlet port 1b are in registration as in Fig. 1. When the slots 2a and 2e reverse their positions 180 degrees by a half rotation of the shell 3 and the valve 11, this valve will be closed over the inlet port 1b.

Installation

By way of illustrating the best presently known mode of applying the invention, the device illustrated in Fig. 1 may be installed in the eduction tubing of wells at intervals which, for example, may vary from 300 to 500 feet. Well conditions will control the number of devices which should be placed in any series, three to five devices in a series ordinarily being satisfactory.

*Operation, Fig. 1*

In the form of the invention shown, the guide pins 1c and 1c' contacted alternately by the upper and lower inclined cam surfaces of the actuator sleeve 2—2' govern all rotational movements of the actuator sleeve and consequently they control the opening and closing movements of the pressure fluid control valve.

The path of the pressure fluid entering the device illustrated is through the aligned openings 10b, 12a, and the inlet port 1b, as is apparent.

The device has only two valve positions, one fully open as in Fig. 1 and the other completely closed.

Each time the actuator pins 8 and 8' are pulled upward and released to be returned by the spring 15, the shell 3 and the valve 11 will describe a one-half rotation about the nipple 1; thereby opening the valve if it be closed, or closing the valve if it be open.

For example, the valve 11 being open as in Fig. 1 with the guide pin 1c in the slot 2a and the guide pin 1c' in the slot 2e, to close the valve proceed as follows: Raise the actuator pins 8 and 8' until the lower inclined cam surface 2b contacts the guide pin 1c and the lower inclined cam surface 2f contacts the guide pin 1c'. These surfaces will rotate the actuator until the guide pin 1c will be contained in the pocket 2c and the guide pin 1c' will be contained in the pocket 2g. Then, release the pins 8 and 8'; whereupon the spring 15 will force the actuator downward until the upper inclined cam surface 2d will guide the pin 1c into the slot 2e and the upper inclined cam surface 2h will guide the pin 1c' into slot 2a. The valve 11 will be closed then.

The sleeve valve 11 being closed with the guide pin 1c in the slot 2e and the guide pin 1c' in the slot 2a, to open the valve proceed as follows: Raise the actuator pins 8 and 8' until the lower inclined cam surface 2f contacts the guide pin 1c, and the lower inclined cam surface 2b contacts the guide pin 1c'. These cam surfaces will rotate the actuator sleeve until the guide pin 1c will contact the pin pocket 2g, and the guide pin 1c' will contact the pin pocket 2c. Then, release the pins 8 and 8'; whereupon the upper inclined cam surface 2h will guide the pin 1c into the slot 2a and the upper inclined cam surface 2d will guide the pin 1c' into the slot 2e. The sleeve valve 11 will be open again then, as in Fig. 1.

Manifestly, at the beginning of the foregoing operation, if the guide pin 1c should be in the slot 2e and the pin 1c' should be in the slot 2a, the operation will be so entirely similar to that described above as to be understood without further explanation.

*The operating tool*

The tool appearing in Figs. 1 and 6 has its slots, pockets, and helically inclined cam surfaces shown diagrammatically in Fig. 8. This tool, which constitutes the subject matter of the present application, is highly important because it is the best means known to the applicant whereby the valves of the device illustrated in Fig. 1 can be opened and closed selectively.

The operating tool 37 has a series of slots, pockets, and helically inclined cam surfaces formed around a one piece rod or shaft-like member. This tool may be lowered into the tubing by means of the cable 35 upon which it is shown secured by the solder or babbit 36 (see Fig. 1).

When the tool 37 encounters the actuator pins 8 and 8', Fig. 1, the long entrance guide slopes or cam surfaces 37a and the short entrance guide slopes or cam surfaces 37b will rotate the tool, if necessary, to receive the pins 8 and 8' within the entrance slots 37c and 37d to engage the actuator pins upon the first upper helically inclined cam surface 37f and the third upper helically inclined cam surface 37e which will rotate the tool further to engage these pins within the first upper pin pocket 37h and the second upper pin pocket 37g which will arrest the downward movement of the tool. Then, when the tool is raised, the first lower helically inclined cam surface 37k and the third lower helically inclined cam surface 37j will engage the pins and rotate the tool further to engage the actuator pins within the first lower pin pocket 37n and the second lower pin pocket 37m; thus permitting the actuator to be raised by pulling upon the cable. When next the tool is lowered, the pins 8 and 8' will be contacted by the second upper helically inclined cam surface 37q and the fourth upper helically inclined cam surface 37p; whereby the tool will be rotated further so that the exit slots 37r and 37s will pass over the actuator pins. The tool is ready then to be lowered to the next device of the series or to be withdrawn through the device or devices above it.

In raising the tool 37 through the upper devices, the long upper exit guide slopes or cam surfaces 37t and the short upper exit guide slopes or cam surfaces 37u will rotate the tool to receive the actuator pins 8 and 8' within the exit slots 37r or 37s. As the tool is raised further, the second lower helically inclined cam surface 37w and the fourth lower helically inclined cam surface 37v will rotate the tool slightly to enable the slots 37c and 37d to clear the pins.

In this construction employing two actuator pins, it will be observed that the long entrance guide slopes or cam surfaces 37a extend somewhat below the other short entrance guide slopes or cam surfaces 37b and that the long exit guide slopes 37t extend somewhat above their companion short slopes 37u. This one longer pair of guide slopes above and below the slots, pockets, and inclined cam surfaces provides that the tool, while traveling upward or downward, never can become impinged upon the same sides of the two actuator pins, the longer slopes serving as pilots to prevent such impingement. However, if the guide slopes are of equal length, the tool will function when so made.

While I have shown upper and lower pin pockets in the operating tool 37, it will be understood that these pockets are not essential and that they may be omitted without impairing the operation of the tool.

The operating tool, free to be rotated, thereby slightly twisting the proximate portion of the cable with it, is shunted axially by its inclined surfaces contacting the actuator pins 8 and 8', whereby the tool, as it is reciprocated, alternately engages and releases these pins. After each pull upon these pins, the tool may be lowered through the device and then withdrawn from the well or it may be lowered to the next device for similar action.

It will be noted that one cable pull upon the tool 37 will change the device from open to closed, and vice versa. Manifestly, two cable pulls, spaced by a release of the tool, will enable the tool to be passed through any device; thereby leaving that device in the same position as before being pulled upon the first time. Thus the first pull changes the original condition of the device, whatever it might be, but the second pull restores the device to its original condition. Any change in the device is only temporary and of the briefest duration, if it is desired to lower the tool past a device and leave it in the condition in which it is found.

The outstanding operative characteristic of the tool 37 is as follows: It will land upon each device upon which it is lowered. Then one pull upon the tool will open the device, if closed or close the device, if open. The tool may be lowered through the device which has last been pulled upon, after which it may be either raised out of the well or lowered to the next device to open it if closed or to close it if open, as was stated for the action of the tool upon the valve above.

For illustration, it will be assumed that there are several devices in a well, and that the upper device is open, all other devices being closed. Now, to close the upper device and open the third device for example, proceed as follows: Lower the operating tool 37 until it contacts the upper device and pull once. That will close the upper device. Then, lower the tool to the second device which is closed and which it is desired to leave closed. Pull upon this device twice. In doing so, land the tool upon the device and pull once. Then lower the tool through it and raise the tool above it. Then lower the tool upon the device again and pull once more. Then lower the tool through the device which will leave it closed. Lower the tool upon the third device which is closed and pull once. That will open it. The tool may be withdrawn through the upper devices without stopping and without changing any one of the valve positions.

It will be understood that all references to positions and directions such as "upper" and "lower," "upward" and "downward," "above" and "below" apply to the device as illustrated in the accompanying drawing wherein the upper portion of the device is shown uppermost and that such references are made for convenience of description only without any expressed or implied intentions to limit the invention.

What I claim is:

1. An operating tool for remotely controlled flow devices, said tool comprising: a shaft-like rod member having a pair of opposite entrance guide slops, one long and the other short, proximate one end of the rod, a pair of opposite exit guide slopes, one long and the other short, proximate the other end of said rod, a pair of opposite entrance slots between said entrance guide slopes, a pair of opposite exit slots between said exit guide slopes, said entrance and exit slots being in offset relation to each other, a peripheral slot around said rod and between said guide slopes, said slot forming, an upper and a lower opposed series of helically inclined cam surfaces in offset relation to each other, the cam surfaces of one series sloping in the same direction and the cam surfaces of the other series sloping in the reverse direction; and two opposite upper and two opposite lower pin pockets, each at the outer end of one said surface, each said upper pocket confronting one said lower inclined cam surface, each said lower pocket confronting one said upper inclined cam surface, said entrance slots each confronting one said upper inclined cam surface, and each said exit slot confronting one said lower inclined cam surface; and means for securing one end of said shaft-like rod member to a cable.

2. An operating tool for remotely controlled flow devices, said tool comprising: a shaft-like rod member formed with a pair of opposite entrance guide slopes, one long and the other short, proximate one end of said rod, a pair of opposite exit guide slopes, one long and the other short, proximate the other end of said rod; a pair of opposite entrance slots between said entrance guide slopes, a pair of opposite exit slots between said exit guide slopes, said entrance and exit slots being in offset relation to each other, a peripheral slot around said rod and between said guide slopes, said slot forming, upper and lower opposed series of helically inclined cam surfaces, said upper series consisting of first, second, third, and fourth inclined cam surfaces, said lower series comprising first, second, third, and fourth inclined cam surfaces, said upper cam surfaces sloping in one direction, said lower cam surfaces sloping in the reverse direction, said upper and lower cam surfaces being in offset relation to each other; first and second upper pin pockets between adjacent said upper cam surfaces; and first and second lower pin pockets between adjacent said lower cam surfaces, said entrance slots confronting the first and third said upper cam surfaces, said exit slots confronting the second and fourth said lower cam surfaces, said upper pockets confronting said first and third said lower cam surfaces, and said lower pockets confronting said second and fourth upper cam surfaces; and means for securing one end of said shaft-like rod member to a cable whereby said member may be raised or lowered for purposes described.

3. An operating tool for remotely controlled flow devices, said tool being formed with: guide slopes, two pairs of entrance and exit slots, with the slots of each pair rotatably offset relative to those of the other; two pairs of upper inclined cam surfaces, there being a pair upon each of opposite sides of said rod and between one pair of said slots, said cam surfaces sloping in one direction; and two pairs of lower inclined cam surfaces, there being a pair of said lower cam surfaces upon each of opposite sides of said rod and between the other pair of said slots, said lower cam surfaces sloping in reverse direction from the upper, said upper and lower cam surfaces being staggered with respect to one another, said upper and lower cam surfaces being spaced from and facing each other.

4. In an operating tool for remotely controlled valves having pins: a shaft-like rod member having an enlarged portion separated into two portions by a peripheral slot, said slot forming a series of upper and lower inclined cam surfaces further separated into pairs by a pair of upper and lower oppositely positioned slots, said enlarged portion having a pair of oppositely positioned guide slopes upon each end and cooperative to guide said pins into said slots as said tool is moved relative to said pins, said upper and lower cam surfaces and slots being staggered with respect to one another.

5. An operating tool for remotely controlled valves having pins: a shaft-like rod member having a pair of upper and a pair of lower enlargements on its periphery, said upper enlargements being spaced from and staggered with respect to said lower enlargements, the enlargements of the upper pair being spaced apart to provide two longitudinal pin passages, the enlargements of the lower pair being spaced apart to provide two longitudinal pin passages, the upper enlargements each having a pair of converging pin guide slopes, each of the lower enlargements having a pair of converging pin guide slopes, each pair of enlargements having portions opposite one another, which portions are provided with pairs of inclined cam surfaces separated by longitudinal pin-receiving recesses, for purposes described.

6. An operating tool for remotely controlled valves having pins: a rod-like member having two annularly disposed enlargements spaced apart to provide an annular continuous passage, one of said enlargements comprising two elements separated from one another by two longitudinal pin-passing passages communicating with said annular passage; said two elements each having an upper pair of converging guide surfaces and a pair of lower cam surfaces separated by longitudinal pin pockets communicating with said annular passage; the other enlargement comprising two elements separated from one another by pin-passing longitudinal passages communicating with said annular passage and staggered with respect to the first mentioned longitudinal pin-passing passages; said other two elements each having a lower pair of converging guide surfaces and an upper pair of cam members separated by longitudinal pin pockets staggered with respect to said first mentioned longitudinal pin pockets and communicating with said annular passage for purposes described.

ALEXANDER BOYNTON.